United States Patent
Schott et al.

[11] Patent Number: 5,984,104
[45] Date of Patent: *Nov. 16, 1999

[54] PROTECTIVE CARRIER FOR MAGNETIC HEAD ASSEMBLY

[75] Inventors: Daniel P. Schott, San Jose, Calif.; Leong Tzeh Ren, Penang; Cheng Thim Seong, Pulau Penang, both of Malaysia

[73] Assignee: Read-Rite Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/009,718

[22] Filed: Jan. 20, 1998

[51] Int. Cl.$^6$ .................................................. B65D 85/00
[52] U.S. Cl. ........................... 206/728; 206/593; 206/454
[58] Field of Search .................................... 206/576, 593, 206/454, 711, 728; 118/500

[56] References Cited

U.S. PATENT DOCUMENTS

| | | | |
|---|---|---|---|
| 3,653,498 | 4/1972 | Kisor | 206/728 |
| 5,482,164 | 1/1996 | Karns | 206/728 |
| 5,706,946 | 1/1998 | Kakizaki et al. | 206/711 |

*Primary Examiner*—Paul T. Sewell
*Assistant Examiner*—Nhan T. Lam
*Attorney, Agent, or Firm*—Nathan N. Kallman

[57] ABSTRACT

A protective carrier for a magnetic head magnetic head assembly includes a housing having buffering members attached to the housing. When the carrier is engaged with the magnetic head magnetic head assembly, the buffering members are rotated into the spacings between the magnetic heads so as to prevent direct physical contact of the magnetic heads. When the carrier is disengaged from the magnetic head magnetic head assembly, the buffering members are rotated out of the spacings between the magnetic heads. The carrier prevents collision of the magnetic heads during handling and transportation and consequently reduces production loss.

12 Claims, 5 Drawing Sheets

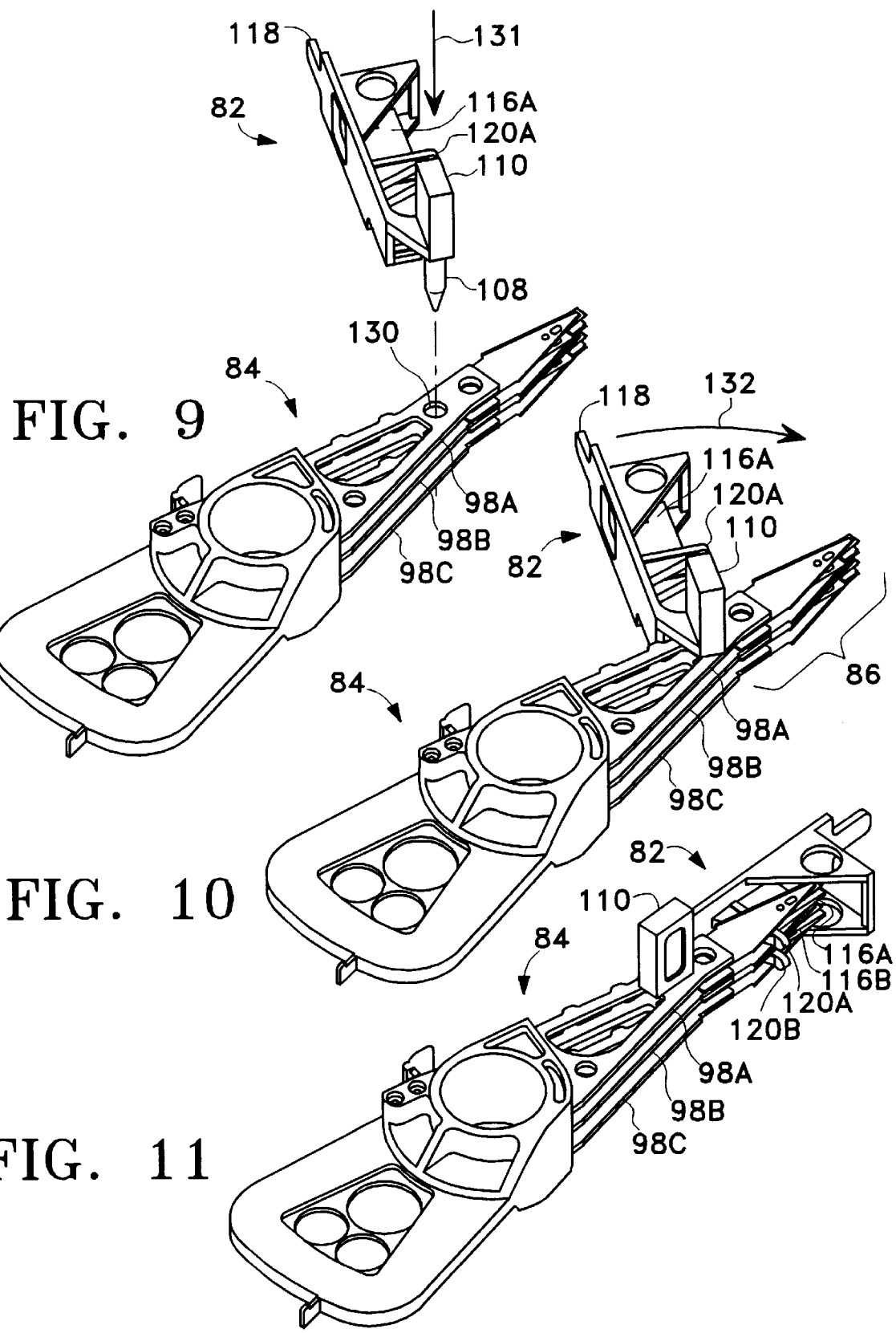

PROTECTIVE CARRIER FOR MAGNETIC HEAD ASSEMBLY

FIELD OF THE INVENTION

This invention relates to microelectronic product packaging, and in particular to packaging of magnetic head assemblies for preventing contact damage during shipping and handling.

BACKGROUND OF THE INVENTION

Magnetic recording media in the form of tapes or disks have widely been used for data storage. Magnetic heads are commonly employed to perform the tasks of interacting with these recording media.

FIG. 1 shows a typical arrangement of a magnetic head assembly 40 interacting with a stack of magnetic disks 66. The assembly 40 includes a magnetic transducer 50 disposed on a slider 52 which in turn is attached to a load beam 54 through a flexure 56. The slider 52, the flexure 56, and the load beam 54 are collectively called a gimbal assembly 58 which is joined to an actuator arm 60A of an arm assembly 62 rotatable about an arm axis 64. The stack of disks 66 includes a plurality of spaced apart disks 66 rotatable about a common spindle 68. The actuator arm assembly 62 includes head arms 60A–60C which extend to the disks 66A and 66B.

During normal operation, the disks 66A and 66B spin at high speed in the direction 70 about the spindle 68. The aerodynamics of the moving air between the slider 52 and the disk surface 72 provide sufficient buoyancy to suspend the slider 52 above the disk surface 72 of the disk 66A. At the same time, the spring forces of the load beam 54 and the resilient flexure 56 urge the slider 52 toward the disk surface 72. An equilibrium point is reached whereby the slider 52 flies over the disk surface 72 at a substantially fixed distance, which is called the flying height of the magnetic head 50. Data can be written onto or read from the disk surface 72 without the magnetic head 50 contacting the disk surfaces 72.

Switching from the normal operating mode to the idle mode, the stack of disks 66 decelerates in angular velocity. At the same time, the arm assembly 62 slowly sweeps toward the spindle 68 in the direction 73 as shown in FIG. 1. The decrease in angular velocity of the disks 66 consequently reduces the air buoyancy between the slider 52 and the disk surface 72. Eventually the slider 52 carrying the magnetic head 50 slowly decends onto data track 75 near the spindle 68. The reverse action occurs when the head 50 takes off from the idle mode and enters into the normal operating mode.

Inside the hard drive housing (not shown), the magnetic head 50 is controllably positioned both during the operating mode and the idle mode. That is, the movement of the magnetic head 50 is designed to encounter no direct impact force which can cause subsequent damages. However, prior to the installation of the head assembly 40 to the stack of disks 66, the magnetic heads 50 are normally exposed with no physical protection, much less any controlled head movement for safeguarding the magnetic head 50.

FIG. 2 is an enlarged view showing the relationship of the magnetic heads 50 in a multi-head assembly 40 without the magnetic disks 66A–66B. It should be noted that FIG. 2 merely illustrates the physical relationship between the various components associated with the magnetic heads 50. The sliders 52 are attached to the flexures 56 which are made of flexible material. It is apparent that collisions of the sliders 52 with each others are highly possible and may consequently cause damages to the heads 50. During transportation, the head assembly 40 is placed in a conventional carrier (not shown) in which the sliders 52 carrying the heads 50 are prone to collide with each other. Likewise, the assembly 40 is subject to similar treatment passing through an assembly line. As a consequence, portions of the sliders 52 may crack or chip away which will result in reduced production yield.

Protection of magnetic heads and sliders has been an ongoing problem. U.S. Pat. No. 5,482,164, Karns, entitled "E-Block Shipping Comb", issued Jan. 9, 1996, describes a design which includes a flexure comb attached to a frame. During usage, the plurality of flexures are placed into the comb having the flexures interleaving with the comb spikes. The placement of the flexures in between the comb spikes is a time consuming process as each flexure has to be carefully positioned between the spikes. Moreover, the manual insertion of the flexures in between the comb spikes may well deform the flexures. In addition, vibrational movement of the sliders can also possibly bend the delicate flexures.

Magnetic heads are now built with smaller sizes and with more delicate and flexible flexures. As a consequence, sliders are more likely to collide with each other and cause greater damage. Furthermore, the delicate flexures are extremely vulnerable to deformation if improperly handled. A deformed flexure, even if slight, would be prone to mechanically resonate at a lower frequency during usage and is detrimental to the performance of the magnetic head. To minimize losses in production shipping, there has been an increasing need to provide reliable packaging to magnetic heads.

SUMMARY OF THE INVENTION

It is an object of the invention to provide a protective carrier for a magnetic head assembly to minimize losses in production and shipping.

It is another object of the invention to provide a protective carrier for a magnetic head assembly with ease of fabrication and low manufacturing cost.

In accordance with this invention, a protective carrier includes a housing having buffering members attached to the housing. During shipping for example, the carrier is engaged with the magnetic head assembly. During engagement, the buffering members are rotated into the spacings between the magnetic heads so as to prevent direct physical contact of the magnetic heads. To retrieve the magnetic head assembly from the carrier, the carrier is disengaged from the head assembly by rotating the buffering members out of the spacings between the magnetic heads. The carrier of the invention prevents collisions of the magnetic heads during handling and transportation and consequently reduces losses in production and shipping.

BRIEF DESCRIPTION OF THE DRAWINGS

FIGS. 9–11 are sequential views illustrating the process of engaging the carrier of the invention with the magnetic head assembly.

DETAILED DESCRIPTION OF THE INVENTION

Figure 1:
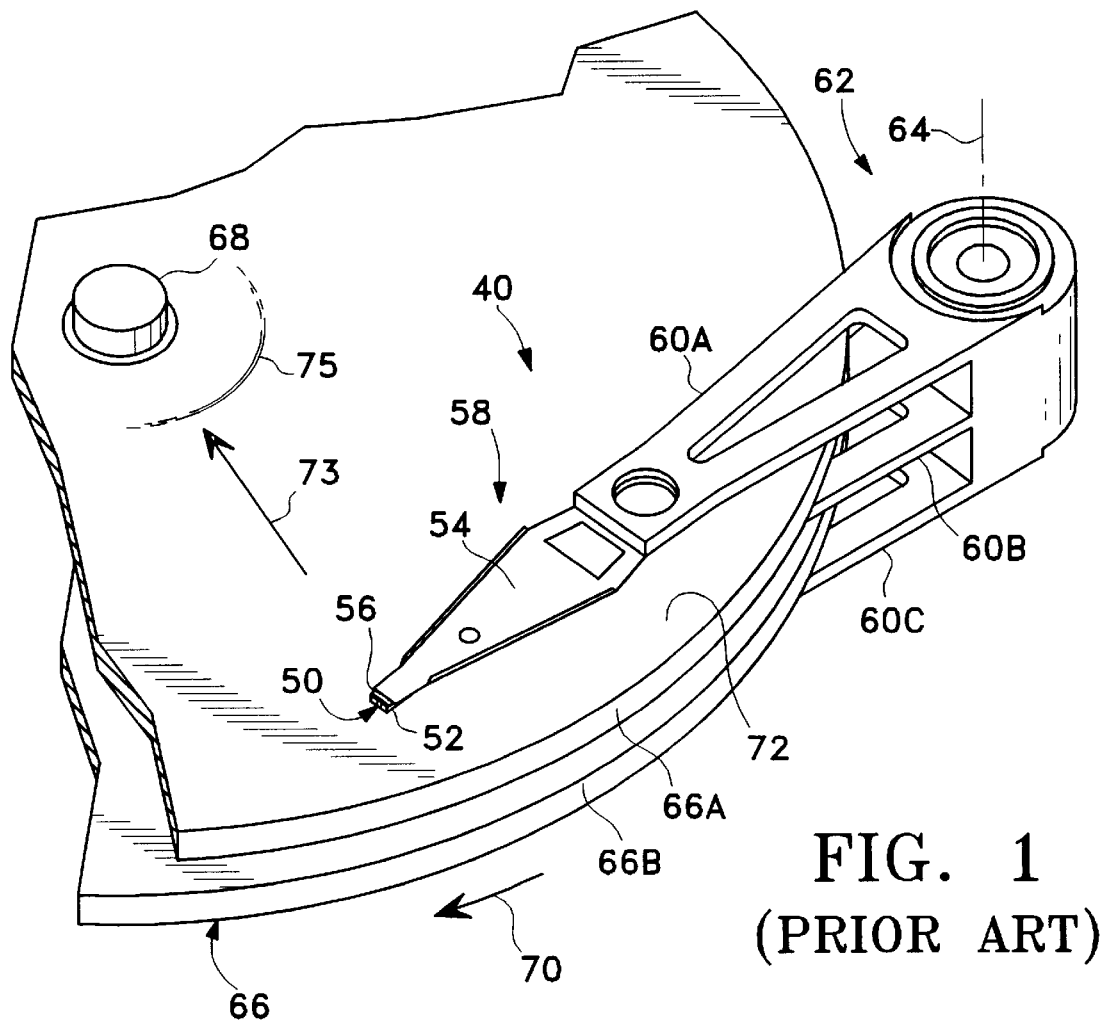
FIG. 1, as described above, is a perspective view showing a magnetic head assembly interacting with a stack of magnetic disks.
Figure 2:
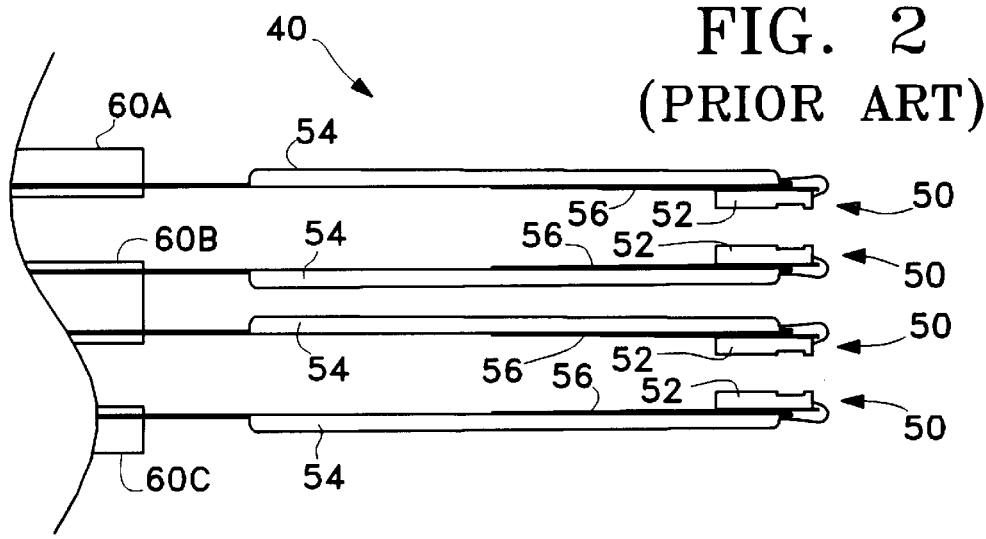
FIG. 2, as described above, is side elevational view illustrating the arrangement of the various components associated with the magnetic heads in a multi-head assembly.
Figure 3:
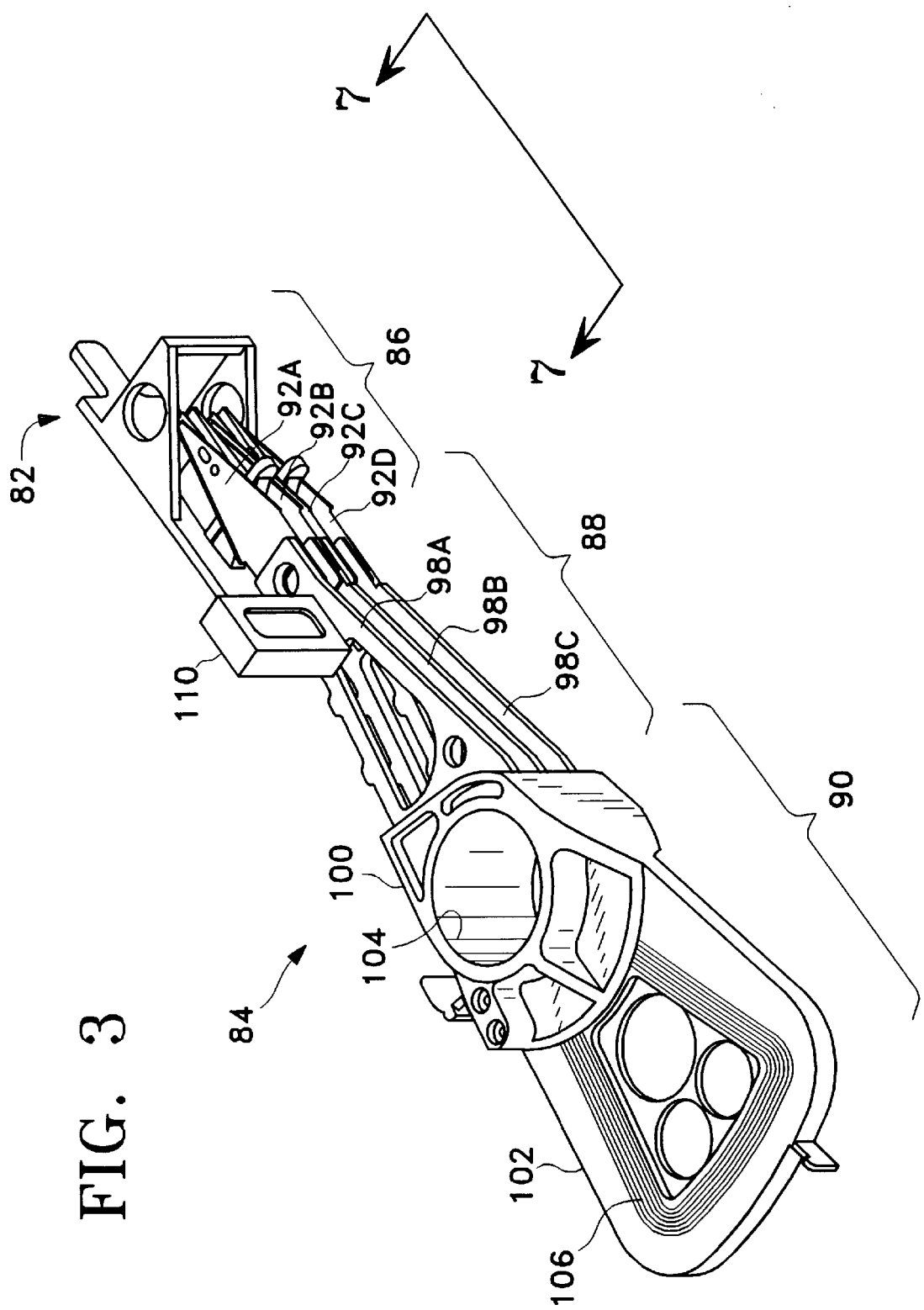
FIG. 3 is a perspective view showing the protective carrier, in accordance with the invention, engaged with a magnetic head assembly.

FIG. 3 illustrates a magnetic head assembly carrier 82, made in accordance with the invention. The carrier 82 is shown engaged with a magnetic head assembly 84 which includes a front portion 86, a midportion 88, and an end portion 90. The front portion 86 comprises a plurality of load beams 92A–92D, which in turn carry respective flexures and magnetic heads as shown in FIG. 3 and in FIG. 6 for example. The load beams 92A–92D are attached to the distal ends of a plurality of actuator arms 98A–98C as illustrated in FIG. 3. The actuator arms 98A–98C are also attached at their proximal ends to the end portion 90 of the assembly 84, which end portion 90 includes a pivotal portion 100 and a counter weight portion 102. The pivotal portion 100 has a ball bearing cavity 104 which encompasses a ball bearing (not shown) when the head assembly 84 is installed in a disk drive (not shown). The counter weight portion 102 is attached to the pivotal portion 100. During normal operation, the counter weight portion 102 stabilizes the pivotal movement of the assembly 84. The counter weight portion 102 also includes a voice coil 106 which controls the pivotal movement of the assembly 84 when the assembly 84 is installed in a disk drive and is in operation.

Figure 4:
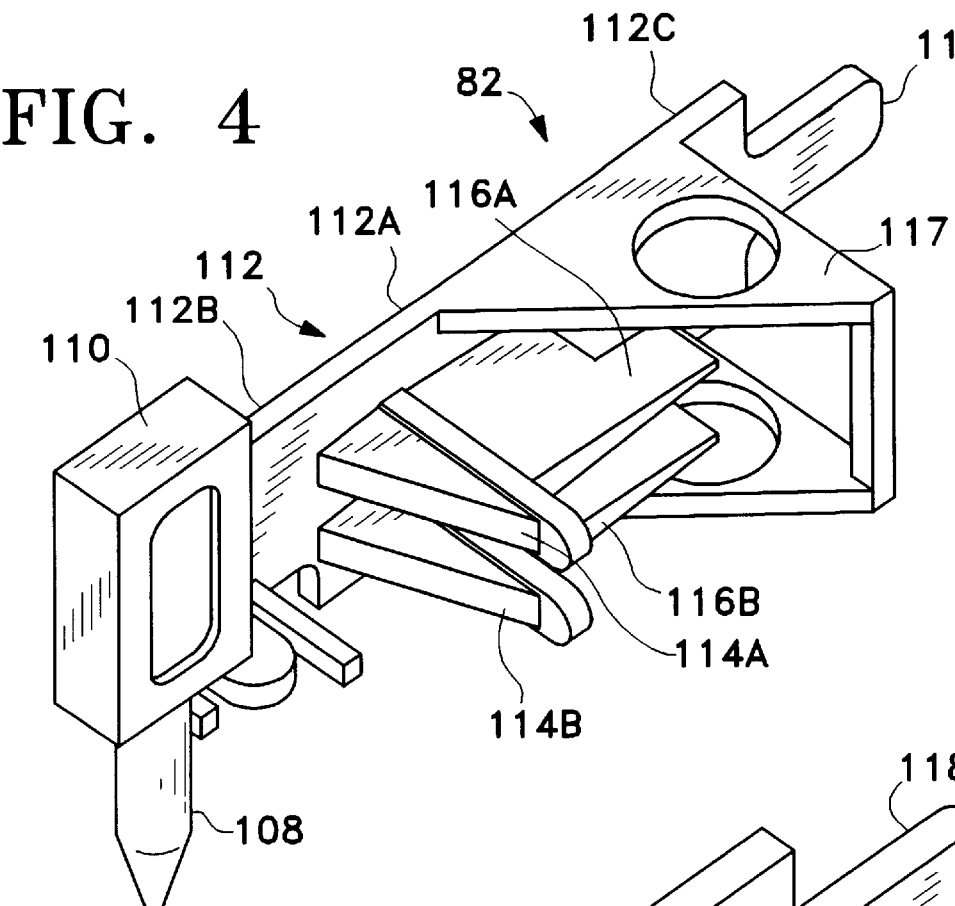
FIG. 4 is a perspective view illustrating the carrier of the invention disengaged from the magnetic head assembly.

The carrier 82 of the invention is shown engaged with the assembly 84 in FIG. 3. FIG. 4 shows the carrier 82 disengaged from the assembly 84. The carrier 82 includes a sidewall 112, which has a midsection 112A, a proximal end section 112B and a distal end section 112C. Protruding from the midsection 112A of the sidewall 112 are a plurality of segregating members 114A and 114B. Attached to the segregating members 114A and 114B are a plurality of buffering members 116A and 116B, respectively. A thumb grip 110 at the proximal end 112B of the sidewall 112 is affixed to an anchoring pin 108.

Extending from distal end 112C of the sidewall 112 is a sheath member 117 which partially covers the buffering members 116A and 116B. The sheath member 117 is installed for the physical protection of the magnetic heads when the head assembly 84 is engaged with the carrier 82. A lever 118 is connected to the distal end 112C of the sidewall 112 for facilitating the pivotal movement of the carrier 82. A window 119 is opened halfway between the midsection 112A and the distal end section 112C of the sidewall 112 to facilitate inspection of the magnetic heads when the head assembly 84 is engaged with the carrier 82.

Figure 5:
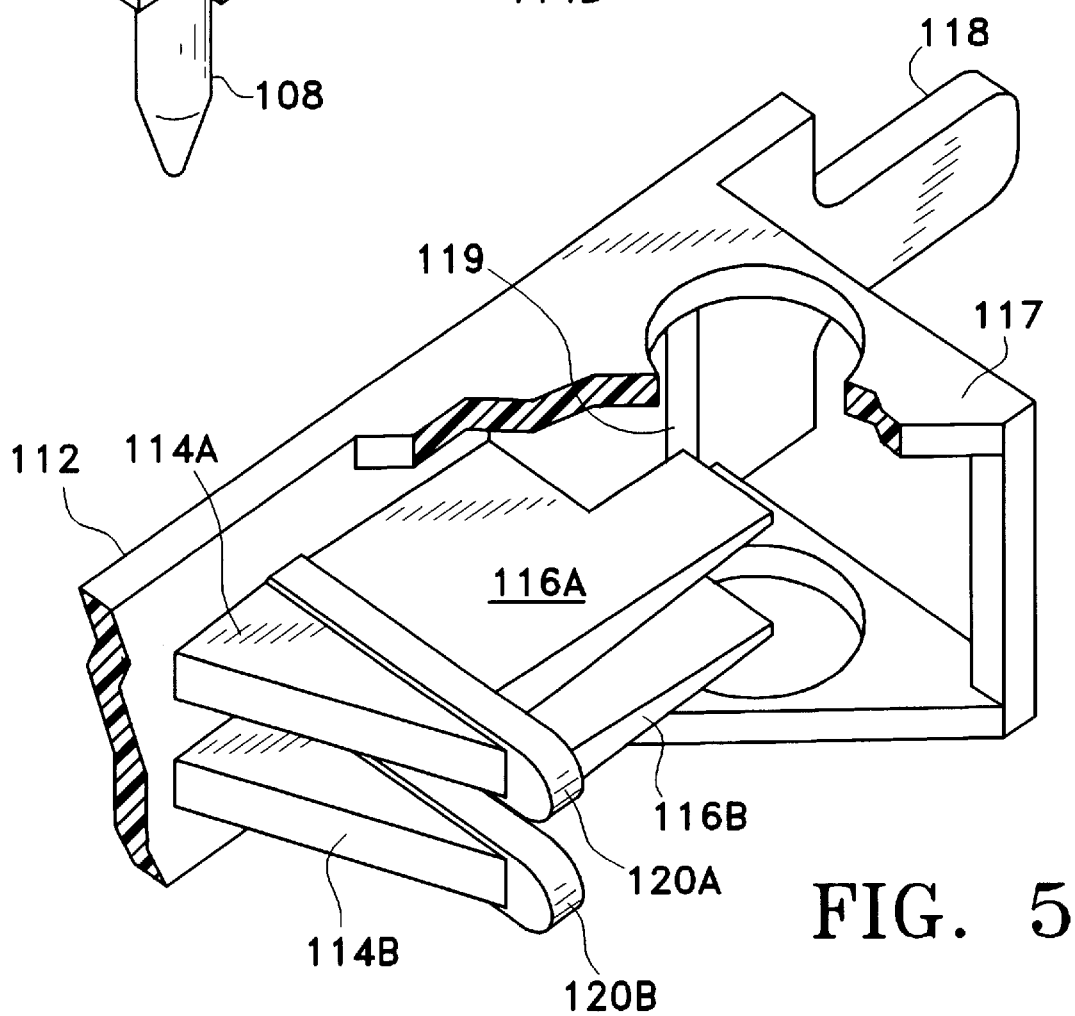
FIG. 5 is a perspective view, partially broken away, illustrating the tapered shapes of the internal members of the carrier of the invention.

FIG. 5 shows the segregating members 114A and 114B, and the buffering members 116A and 116B in further detail with the sheath member 117 partially broken away. Each of the segregating members 114A and 114B is somewhat tapered in shape having one end larger in dimension attached to the sidewall 112, and another end smaller in dimension extending away from the sidewall 112. It is preferred that the smaller ends of the segregating members 114A and 114B include rounded tips 120A and 120B for ease of wedging into the separations between the load beams. Each of the buffering members 116A and 116B is also generally tapered in shape having one end larger in dimension attached to the respective segregating members 114A and 114B, and another end smaller in dimension extending away from the segregating members 114A and 114B.

Figure 6:
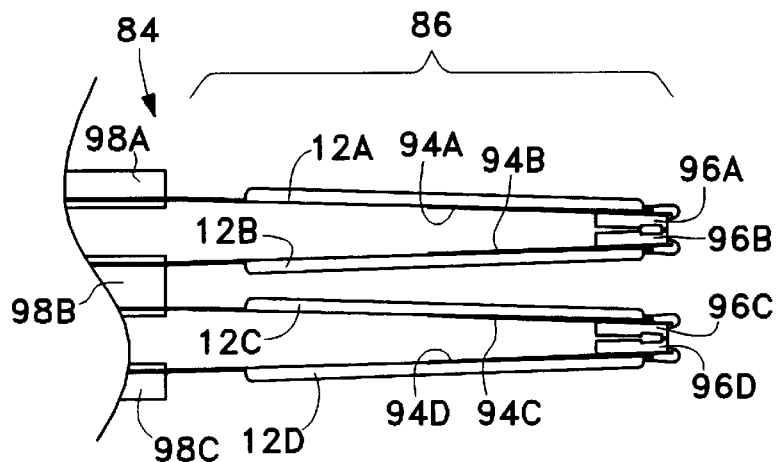
FIG. 6 is a side elevational view of the front portion of the magnetic head assembly shown in FIG. 3 with no protective carrier.

FIG. 6 is a side elevational view of the front portion 86 of the magnetic head assembly 84 disengaged from the carrier 82. The load beams 12A and 12B and the flexures 94A and 94B, with their respective spring forces, press the respective sliders 96A and 96B against one another. Likewise, the load beams 12C and 12D and the flexures 94C and 94D, push the respective sliders 96C and 96D against each other. Problems arise when the assembly 84 is subject to irregular movements, such as during transportation or on an assembly line. For example, the sliders 96A and 96B can momentarily separate from each other and bounce back thereafter and collide with each other. That is, collisions between the sliders 96A–96D, are highly possible. The collisions between the sliders 96A–96D may crack or chip away portions of the sliders 96A–96D. The distortion of the sliders 96A–96D resulting from collisions, albeit slightly, may render the sliders 96A–96D unable to function properly relative to the disk surfaces during normal operation. Most detrimental are the damages inflicted on the delicate read and write transducers attached to the sliders 96A–96D. As a consequence, production yield can be seriously undermined.

Figure 7:
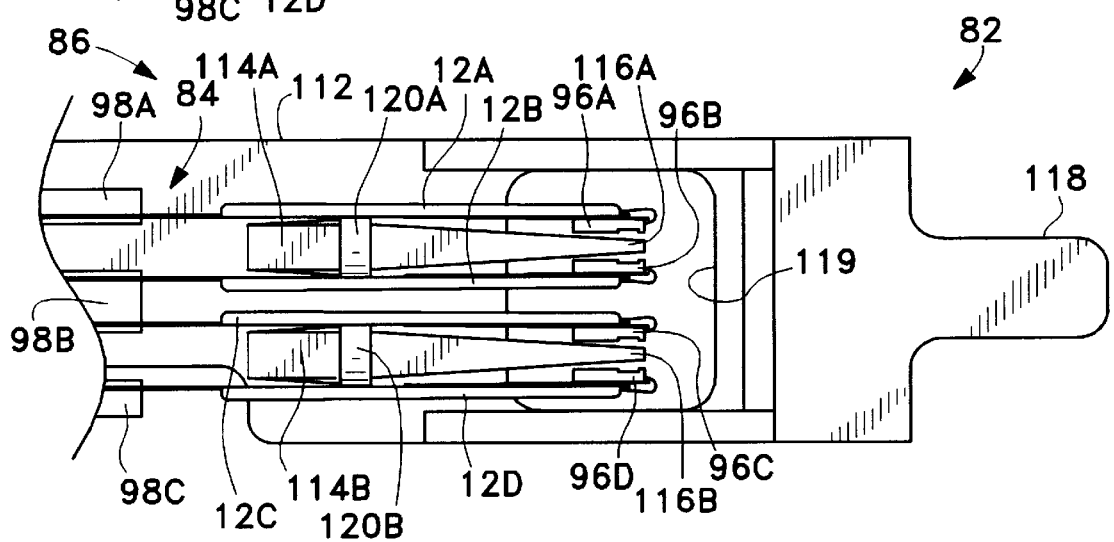
FIG. 7 is a side elevational view of the front portion of the magnetic head assembly shown in FIG. 6 engaged with the protective carrier of the invention.

FIG. 7 is a front elevational view of the front portion 86 of the magnetic head assembly 84 showing the assembly 84 as being engaged with the carrier 82 of the invention. As shown, the segregating members 114A and 114B are disposed between the respective load beams 12A–12B and 12C–12D. In essence, the rounded tips 120A and 120B are wedged between the respective load beams 12A–12B and 12C–12D, counteracting any spring forces exerted by the load beams 12A–12D. The load beams 12A and 12B flex against the buffering member 116A. In a similar manner, load beams 12C and 12D press against the buffering member 116B. With this arrangement, the wedging of the rounded tips 120A and 120B of the respective segregating members 114A and 114B against the load beams 12A and 12B substantially dampen any vibrational swings caused by the load beams 12A–12D. Any collision caused by vibration is small, in amplitude and magnitude. Furthermore, the positions of the buffering members 116A and 116B are such that the sliders 96A–96D will strike the buffering members 116A and 116B which are made of soft material, should collision occur. In this embodiment, the buffering members are made of the same material as the entire carrier 82 which is plastic. Accordingly, the possibility of damaging the sliders 96A–96D is significantly reduced.

Figure 8:
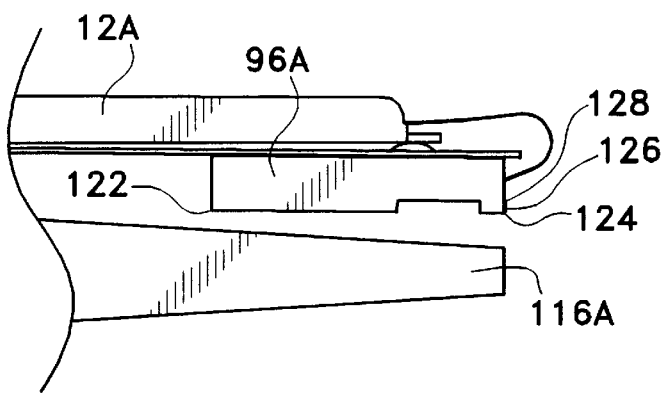
FIG. 8 is an enlarged side elevational view of FIG. 7 showing a slider in position above the buffering member of the carrier of the invention.

The tapered shape of the buffering members 116A and 116B also offers another protective mechanism to the carrier 82. Reference is now directed to FIG. 8 which is an enlarged view of the area surrounding the slider 96A. The slider 96A, similar to other sliders such as the sliders 96B–96D, has a leading edge 122 and a trailing edge 124. The read and write transducers 126 and 128 are deposited on the slider 96A at the trailing edge 124. Should collision between the slider 96A and the buffering member 116A occur, it would be the leading edge 122 of the slider 96A that impacts the buffering member 116A, because of the tapered shape of the member 116A. The collision would be mild in nature due to the softness of the buffering member 116A and the dampened swing of the associated load beam 12A. The possibility of the trailing edge 124 of the slider 96A striking the buffering member 116A is slim because the buffering member 116A tapers away from the trailing edge 124. As a consequence, the read and write transducers 124 and 128 are securely protected.

FIGS. 9–11 show a sequence of the process of mounting the carrier 82 of the invention to the magnetic head assembly 84. The carrier 82 is shown in an engagement mode and a disengagement mode respectively in FIGS. 10 and 11.

FIG. 9 shows the carrier 82 prior to engaging with the magnetic head assembly 84. Before engagement, the anchoring pin 108 is aligned with apertures 130 formed in the load beams 98A–98C. By using the thumb grip 110, the anchoring pin 108 is pushed into the apertures 130 in a downward direction 131.

After the pin 108 is anchored into the aperture 130, to lock the carrier 82 into the engagement mode, the carrier 82 is rotated in the direction 132 toward the front portion 86 of the head assembly 84 via the lever 118 as shown in FIG. 10. The rounded tips 120A and 120B attached to the segregating members 114A and 114B are consequently inserted into the spacings between the load beams 98A–98C. The segregating members 114A and 114B slightly spread the load beams 98A–98C apart in a manner as shown in the elevational view in FIG. 7. At the same time, the buffering members 116A and 116D are disposed between the sliders 96A–96D. The carrier 82 is in the engagement mode with the magnetic head assembly 84 as shown in FIG. 11.

To disengage the carrier 82 from the magnetic head assembly 84, the reverse of the above-described process shown in FIGS. 9–11 applies. The carrier 82 of the invention can be fabricated as one integral unit by the conventional process of plastic injection molding, for example.

Finally, other variations are possible within the scope of the invention. The carrier 82 of the invention is described as an integral unit and is formed of plastic. Various members, such as the segregating members 114A and 114B or the buffering members 116A and 116B can be separated from the carrier body and be attached to the carrier via various means of attachment. The material used for the carrier 82 is not restricted to plastic and may be from other materials, such as polystyrene, teflon or a metal such as copper. Described herein is a carrier 82 with two segregating members 114A and 114B, and two buffering members 116A and 116B. The number of segregating and buffering members may vary. For example, a carrier of one segregating member and one buffering member can be used with a magnetic head assembly with two magnetic heads. Likewise, a carrier with more than two segregating members and more than two buffering members can be used with a magnetic head assembly having multiple magnetic heads. These and other changes in form and detail may be made therein without departing from the scope and spirit of the invention.

What is claimed is:

1. A magnetic head assembly comprising:

a plurality of actuator arms;

a plurality of spaced load beams attached to said plurality of actuator arms;

a plurality of flexures respectively joined to said load beams;

a plurality of sliders respectively supported by said flexures at the ends of said flexures, each slider having a magnetic transducer thereon, pairs of sliders being disposed in opposition so that the air bearing surfaces face each other;

a rotatable carrier for engaging and for carrying said magnetic head assembly;

segregating members attached to said carrier for wedging into the separations between said load beams when said carrier is rotated;

buffering members made of a soft material attached to said segregating members, and positioned between said flexures and the opposing sliders when said carrier is rotated for engaging and carrying said magnetic head assembly so that collision and direct contact between said sliders is prevented during transport and handling.

2. The magnetic head assembly as set forth in claim 16 wherein said buffering members are tapered in shape, each having one end with a smaller dimension buffering said sliders and another end with a larger dimension attached to said carrier.

3. The magnetic head assembly as set forth in claim 1 further including a sheath member attached to said carrier for encompassing said magnetic head assembly.

4. A magnetic head assembly as in claim 1, wherein said carrier and said buffering members are made of plastic.

5. A magnetic head assembly comprising:

a plurality of actuator arms;

a plurality of spaced load beams attached to said plurality of actuator arms;

a plurality of flexures respectively joined to said load beams;

a plurality of sliders respectively supported by said flexures at the ends of said flexures, each slider having a magnetic transducer thereon, pairs of sliders being disposed in opposition so that the air bearing surfaces face each other; operating in an engagement mode and a disengagement mode, comprising:

a housing adapted for engaging with and disengaging from said magnetic head assembly;

segregating members having rounded tips for wedging between said load beams to dampen vibrational swings of said load beams;

buffering members attached to said housing, said buffering members being rotatably engageable between said magnetic head sliders, such that during said engagement mode said buffering members are rotated toward and between said magnetic head sliders for preventing direct contact between said magnetic head sliders, thereby protecting collision of said magnetic head sliders, and such that during said disengagement mode, said buffering members are rotated away from said magnetic head sliders allowing said housing to be disengaged from said magnetic head assembly.

6. The magnetic head assembly as set forth in claim 5 wherein said housing and said buffering member are formed of plastic.

7. The magnetic head assembly as set forth in claim 5 wherein said housing includes a thumb grip attached to a pin members which is engagable into said magnetic head assembly, thereby allowing said buffering members to be rotated between said sliders.

8. The magnetic head assembly as set forth in claim 5 wherein said housing includes a sheath member attached to one end of said housing for encompassing said magnetic head sliders during said engagement mode.

9. A magnetic head assembly comprising:

a plurality of actuator arms;

a plurality of spaced load beams attached to said plurality of actuator arms;

a plurality of flexures respectively joined to said load beams;

a plurality of magnetic head sliders respectively supported by said flexures at the ends of aid flexures, each slider having a magnetic transducer thereon, pairs of sliders being disposed in opposition so that the air bearing surfaces face each other;

a housing operating in an engagement mode and a disengagement mode and being adapted for releasably engaging said magnetic head assembly, said housing having a sidewall which includes a midsection, a proximal end section and a distal end section;

a segregating member attached to said midsection of said sidewall, said segregating member being tapered, having one end larger in dimension attached to said midsection of said sidewall and another end smaller in dimension capable of being releasably wedged between the spacings between said plurality of said magnetic head sliders;

a buffering member attached to said segregating member, said buffering member being rotatably engageable between said magnetic head sliders such that during said engagement mode, said buffering member is rotated toward said magnetic head sliders allowing said buffering member to be positioned between said magnetic head sliders so as to prevent direct contact of said magnetic head sliders, thereby protecting said magnetic head sliders, and such that during said disengagement mode, said buffering member is pivotally rotated away from said magnetic head sliders allowing said housing to be releasably disengaged from said assembly.

10. The magnetic head assembly as set forth in claim 9 including:

a thumb grip attached to said proximal end section of said sidewall; and a pin member attached to said thumb grip, said pin member being engagable to said magnetic head assembly thereby allowing said buffering member to be rotatably engaged between said sliders.

11. The magnetic head assembly as set forth in claim 10 including:

a sheath member attached to the distal end of said sidewall for encompassing said sliders during said engagement mode; and a lever attached to the distal end of said sidewall adjacent to said sheath member for releasably engaging and disengaging said magnetic head assembly.

12. A method for protecting spaced magnetic head sliders, which are supported by flexures that are attached to load beams, during assembly and transportation, using a carrier including soft plastic buffering members and segregating members that are attached to a housing, wherein prior to said buffering members being rotated toward said magnetic head sliders during an engagement mode, said segregating members are releasably wedged between said load beams thereby allowing said buffering members to be positioned between said magnetic head sliders, and wherein prior to said buffering members being rotated away from said magnetic head sliders during said disengagement mode, said segregating members are releasably wedged away from said load beams thereby allowing said housing to be releasably disengaged from said assembly.

* * * * *